United States Patent [19]

Jensen et al.

[11] Patent Number: 5,662,985
[45] Date of Patent: Sep. 2, 1997

[54] TWO-SIDE COATED LABEL FACESTOCK

[75] Inventors: Terry O. Jensen, Middlesex; Dan-Cheng Kong, Fairport, both of N.Y.

[73] Assignee: Mobil Oil Corporation, Fairfax, Va.

[21] Appl. No.: 646,784

[22] Filed: May 21, 1996

[51] Int. Cl.$^6$ .................................................. B32B 3/00
[52] U.S. Cl. .................. 428/195; 428/304.4; 428/317.7; 428/355 R; 428/402; 428/411.1; 428/480; 428/483; 428/500; 428/515
[58] Field of Search ............................... 428/195, 304.4, 428/317.7, 355 R, 402, 411.1, 480, 483, 500, 515

[56] References Cited

U.S. PATENT DOCUMENTS

| | | | |
|---|---|---|---|
| 3,705,076 | 12/1972 | Usala | 161/189 |
| 3,719,629 | 3/1973 | Martin et al. | 260/33.2 |
| 3,753,769 | 8/1973 | Steiner | 117/122 H |
| 4,042,539 | 8/1977 | Fanning | 260/16 |
| 4,525,419 | 6/1985 | Posey et al. | 428/336 |
| 4,577,205 | 3/1986 | Shibata et al. | 346/204 |
| 4,714,658 | 12/1987 | Kadash et al. | 428/523 |
| 4,889,765 | 12/1989 | Wallace | 428/290 |
| 5,006,598 | 4/1991 | Adams et al. | 524/601 |
| 5,066,434 | 11/1991 | Liu et al. | 264/37 |
| 5,070,164 | 12/1991 | Min et al. | 526/286 |
| 5,194,327 | 3/1993 | Takahashi et al. | 428/327 |
| 5,380,587 | 1/1995 | Musclow et al. | 428/353 |
| 5,382,473 | 1/1995 | Musclow et al. | 428/353 |
| 5,425,991 | 6/1995 | Lu | 428/352 |

*Primary Examiner*—William Krynski
*Attorney, Agent, or Firm*—Dennis P. Santini; Jessica M. Sinnott

[57] ABSTRACT

A label facestock structure is described which comprises a polymeric film substrate having on a first surface thereof (A) an adhesive anchor layer and on a second surface thereof (B) an ink base layer, the (A) and (B) layers are selected from the group consisting of:

(i) a prime coating having on an external surface a functional coating of an interpolymer of (a) an α,β-monoethylenically unsaturated carboxylic acid; and (b) a neutral monomer ester comprising an alkyl acrylate ester and an alkyl methacrylate ester; and (ii) an iminated polymer;

or the (A) adhesive anchor layer is selected from the group consisting of:

(iii) a mixture of the functional coating of (i) and the iminated polymer of (ii);

(iv) a linear water dissipatable polyester condensation product; and (v) a polyester; or the (B) ink base layer is selected from the group consisting of:

(vi) a prime coating having on an external surface a functional coating of an acrylic copolymer; and (vii) a prime coating having on an external surface a functional coating of a styrene copolymer, provided that each of the (A) adhesive anchor layer and the (B) ink base layer is different.

24 Claims, No Drawings

TWO-SIDE COATED LABEL FACESTOCK

FIELD OF THE INVENTION

The invention relates to a two-side coated printable plastic film. More specifically, the invention relates to a pressure sensitive label facestock and label structures comprising the label facestock and methods of making the same.

BACKGROUND OF THE INVENTION

Films prepared for use as label facestock are, typically, coated on the printing side with a coating which enhances ink adhesion. For instance, U.S. Pat. No. 5,380,587 discloses a multilayer packaging or label stock film having excellent printability and non-blocking characteristics. The film is first primed and then coated with a copolyester coating. Another ink adhesion enhancing coating is described in U.S. Pat. No. 5,382,473.

Acrylic coatings have also been applied to films for heat sealability as described in U.S. Pat. No. 3,753,769. There a heat sealable coating resin is made from methacrylate, a lower alkyl acrylate and acrylic acid is disclosed.

Pressure sensitive adhesives which permit adhesion without the application of heat are well known. One particular class if pressure sensitive adhesive is disclosed in U.S. Pat. Nos. 4,898,787 and 5,070,164. This adhesive is prepared from emulsion polymerization of a lower alkyl acrylate, such as ethyl acrylate, a lower alkyl methacrylate, such as methyl methacrylate and an acid such as acrylic acid.

SUMMARY OF THE INVENTION

The invention is directed to clear, opaque, white opaque and metallized label facestock structures.

The film is more particularly directed to a printable facestock structure comprising a polymeric film substrate having on a first surface thereof (A) an adhesive anchor layer and on a second surface thereof (B) an ink base layer, the (A) and (B) layers are selected from the group consisting of:

(i) a prime coating having on an external surface a functional coating of an interpolymer of (a) an $\alpha,\beta$-monoethylenically unsaturated carboxylic acid; and (b) a neutral monomer ester comprising an alkyl acrylate ester and an alkyl methacrylate ester; and (ii) an iminated polymer of methyl methacrylate, $C_2$ to $C_8$ alkyl methacrylate or $C_1$ to $C_8$ alkyl acrylate and an ethylenically unsaturated carboxylic acid;

or the (A) adhesive anchor layer is selected from the group consisting of:

(iii) a mixture of the interpolymer defined above in (i) and the iminated polymer defined above in (ii).;

(iv) a linear water dissipatable polyester condensation product of the following monomers or their polyester forming equivalents: terephthalic acid, an aliphatic dicarboxylic acid, a sulfomonomer containing and alkali metal sulfonate group attached to a dicarboxylic aromatic nucleus; and stoichiometric quantities of about 100 mole % of at least one copolymerizable aliphatic or cycloaliphatic alkylene glycol having from 2 to 11 carbon atoms; and (v) a polyester comprising repeating units of the following components: isophthalic acid, 5-sulfoisophthalic acid, 1,4-cyclohexanedimethanol and diethylene glycol; or the (B) ink base layer is selected from the group consisting of:

(vi) a prime coating having on an external surface a functional coating of a copolymer of a $C_1$ to $C_8$ acrylate, $C_1$ to $C_8$ methacrylate and acrylic acid or methacrylic acid; and (vii) a prime coating having on an external surface a functional coating of a styrene copolymer of a $C_1$ to $C_8$ acrylate, $C_1$ to $C_8$ methacrylate and acrylic acid or methacrylic acid, provided that each of the (A) adhesive anchor layer and the (B) ink base layer is different.

The invention is also directed to a composite label structure comprising a film form liner, an adhesive coating adhered to an outer surface of the liner, the outer surface being located adjacent to a face film stock comprising a thermoplastic substrate, the face film stock being secured to the surface of the adhesive coating, the face film stock comprising an adhesive anchor layer located between the adhesive coating and the thermoplastic substrate, the adhesive anchor layer selected from the group consisting of (i) a prime coating having on an external surface an adhesive anchor coating of an interpolymer of (a) an $\alpha,\beta$-monoethylenically unsaturated carboxylic acid selected from the group consisting of acrylic acid, methacrylic acid and mixtures thereof; and (b) a neutral monomer ester comprising an alkyl acrylate ester and an alkyl methacrylate ester;

(ii) an iminated polymer of methyl methacrylate, $C_2$ to $C_8$ alkyl methacrylate or $C_1$ to $C_8$ alkyl acrylate and an ethylenically unsaturated carboxylic acid;

(iii) a mixture of (i) an interpolymer of (a) an $\alpha,\beta$-monoethylenically unsaturated carboxylic acid selected from the group consisting of acrylic acid, methacrylic acid and mixtures thereof; an (b) a neutral monomer ester comprising an alkyl acrylate ester and an alkyl methacrylate and (ii) an iminated polymer of methyl methacrylate, $C_2$ to $C_8$ alkyl methacrylate or $C_1$ to $C_8$ alkyl acrylate and an ethylenically unsaturated carboxylic acid;

(iv) a linear water dissipatable polyester condensation product of the following monomers or their polyester forming equivalents: terephthalic acid, an aliphatic dicarboxylic acid, a sulfomonomer containing and alkali metal sulfonate group attached to a dicarboxylic aromatic nucleus; and stoichiometric quantities of about 100 mole % of at least one copolymerizable aliphatic or cycloaliphatic alkylene glycol having from 2 to 11 carbon atoms; and (v) a polyester comprising repeating units of the following components: isophthalic acid, 5-sulfoisophthalic acid, 1,4-cyclohexanedimethanol and diethylene glycol.

It is an object of this invention to enhance the anchorage of a pressure sensitive glue or adhesive to a label facestock.

It is a feature of this invention to have a coated surface of a label facestock which anchors a pressure sensitive glue or adhesive to the facestock so that all, if not substantially all, the glue or adhesive remains with the facestock when it is removed from either a release liner or another surface (such as a product or product container).

It is an advantage of the invention that when the label facestock is removed or repositioned on the release liner or another surface (such as a product or product container), the glue or adhesive will have a tendency to remain with the label facestock and not another surface.

It is a further advantage of the invention that when the coatings on each side of the substrate are different, the coated-to-coated sides of the film have low blocking tendencies.

By the term "adhesive anchor" it is, typically, meant that the properties of the facestock are such that the facestock securely holds adhesive substances, which include the glues and sticky materials used in manufacturing pressure sensitive labels. Such glues and sticky materials are well known in the art of pressure sensitive label manufacturing.

DETAILED DESCRIPTION OF THE INVENTION

Adhesive Anchor Layer (A) and Ink Base Layer (B)

Interpolymer (i)

Provided that each are different, the adhesive anchor layer (A) and the ink base layer (B) comprise (i) an interpolymer of (a) and $\alpha,\beta$-monoethylenically unsaturated carboxylic acid; and (b) a neutral monomer ester comprising an alkyl acrylate ester and an alkyl methacrylate ester. The calculated glass transition temperature (Tg) of the resin coating should be in the range of from about 100° F. to about 140° F. (about 38° C. to about 60° C.).

The Tg is, typically, defined as the temperature at which a polymer changes from a glassy, brittle solid to a very high viscosity liquid (Bueche, "Physical Properties of Polymers", Interscience Publishers, 1962). At temperatures below or, even slightly above the Tg, polymers exhibit such great resistance to viscous flow that sealing does not take place, regardless of applied pressures or how long the polymer surfaces are left in contact with each other.

The multipolymers may be produced by the proper selection and interpolymerization of the following types of compounds, in the presence of a suitable chain transfer agent; for example, mercaptans or halogenated hydrocarbons: A. a high Tg monomer; B. a low Tg monomer; and C acid containing monomers.

Examples of high Tg monomers which may be employed include, for example, ethyl methacrylate, methyl methacrylate and others.

Examples of low Tg monomers which may be employed include, for example, lower alkyl acrylates such as methyl, ethyl or butyl acrylates.

Examples of acid monomers which may be employed include, for example, acrylic acid, methacrylic acid, maleic acid, crotonic acid and mixtures thereof.

The polymerization reaction may be advantageously carried out by adding the mixed monomers incrementally during the reaction in order to attain a more nearly homogeneous distribution of monomers in the multipolymer molecules.

The relative proportion of monomers which may be employed to produce the multipolymer coating may vary and may include between about 2 percent and about 15 percent, and preferably from about 2.5 percent to about 6 percent of an alpha-beta unsaturated carboxylic acid or mixtures thereof, such as acrylic or methacrylic acid, and from about 85 percent to about 98 percent, and preferably from about 94 percent to about 97.5 percent by weight of the neutral monomer esters. Usually, the neutral monomer esters comprise (a) an alkyl acrylate ester such as methyl ethyl or butyl acrylate and (b) alkyl methacrylate esters such as methyl methacrylate or ethyl methacrylate. In terpolymers which may be produced this way, the monomer components are employed in a ratio such that the alkyl methacrylate monomer is present in an amount of at least 10 percent by weight of the total terpolymer composition and preferably from about 20 to about 80 percent by weight, and the alkyl acrylate monomer component in an amount of at least 10 percent by weight of the total coating composition, and preferably from about 80 to about 20 percent by weight.

Typically, the monomers are interpolymerized utilizing known polymerization techniques, such as, for example, emulsion polymerization. A standard polymerization technique may be employed to produce the terpolymer coating compositions of the present invention such as solution, bulk or emulsion polymerization.

This interpolymer is described in U.S. Pat. No. 3,753,769.

A useful commercially available interpolymer is sold by the Valspar Company under product designation "Valspar 90XW067".

Iminated Polymer (ii)

In another embodiment of the invention the (A) adhesive anchor layer or the (B) ink base layer is (ii) an iminated polymer of methyl methacrylate, $C_2$ to $C_8$ alkyl methacrylate or $C_1$ to $C_8$ alkyl acrylate and an ethylenically unsaturated carboxylic acid.

The iminated polymer can contain an acrylic polymer of methyl methacrylate, an alkyl acrylate or an alkyl methacrylate and an ethylenically unsaturated carboxylic acid that is reacted with an alkylene imine such as ethylene imine, or propylene imine. More specifically, it comprises a polymer of (1.) methyl methacrylate, (2.) alkyl methacrylate having 2 to 12, specifically 2 to 8 carbon, atoms in the alkyl group or an alkyl acrylate having 1 to 12, specifically 2 to 8 carbon atoms in the alkyl group, and (3.) an ethylenically unsaturated carboxylic acid that is reacted with an alkylene imine. Typically, this acrylic polymer is prepared by conventional solution or bulk polymerization techniques in which the monomer, polymerization catalyst and solvents are charged into a polymerization vessel and heated to form a polymer of the desired molecular weight as indicated by the viscosity of the polymer and subsequently reacted with an alkylene imine. One method for preparing these acrylic polymers is provided in U.S. Pat. No. 3,705,076.

Examples of typical alkyl groups of the alkyl methacrylate include: ethyl, propyl, isopropyl, butyl, tert-butyl, hexylmethyl, 2-ethylhexyl, octyl and the like.

Examples of typical alkyl groups of the alkyl acrylates include: ethyl, propyl, butyl, isobutyl, propyl, hexyl, 2-ethylhexyl, octyl, nonyl, decyl, lauryl and the like.

Examples of typical ethylenically unsaturated acids include methacrylic acid, ethylacrylic acid, acrylic acid, itaconic acid and the like.

Any of the alkylene imines mentioned in U.S. Pat. No. 3,705,076 can be used to iminate the acrylic polymers. Specific examples include ethylene imine and propylene imine which, typically, are used in amounts of about 4 to 6% by weight of the acrylic polymer.

A typical acrylic polymer of this invention is (1.) 70 to 90% by weight methyl methacrylate, (2.) 9 to 19% by weight of the $C_2$ to $C_{12}$ alkyl acrylate, and (3.) 1 to 11% by weight of either acrylic acid or methacrylic acid reacted with about 1 to 8% by weight of an alkylene imine. Another typical acrylic polymer of this invention is (1.) 78 to 82% by weight of methyl methacrylate, (2.) 9 to 17% by weight of ethyl acrylate, (3.) 5 to 9% by weight of methacrylic acid reacted with about 4 to 6% by weight of alkylene imine. Still another typical acrylic polymer consists essentially of methyl methacrylate/ethyl acrylate/methacrylic acid in a weight ratio of 80/13/7 and is reacted with 4 to 5% by weight of propylene imine.

Iminated polymers are commercially available from Zeneca Resins under the product designation "Neocryl" such as "Neocryl XK-90" and "Neocryl XA-5090".

Mixture of Interpolymer and Iminated Polymer (iii)

The (A) adhesive anchor layer can be a mixture of the interpolymer defined above in (i) and the iminated polymer defined above in (ii). Typically the ratio of (i):(ii) ranges from about 10:90 to about 90:10, specifically about 40:60 to about 60:40.

Polyester Condensation Products (iv) and (v)

The (A) adhesive anchor layer can be one of a polyester condensation product (iv) or (v).

Polyester condensation product (iv) is, typically, a linear water dissipatable polyester condensation product of the following monomers or their polyester forming equivalents: terephthalic acid, an aliphatic dicarboxylic acid, a sulfomonomer containing an alkali metal sulfonate group attached to a dicarboxylic aromatic nucleus; and stoichiometric quantities of about 100 mole % of at least one copolymerizable aliphatic or cycloaliphatic alkylene glycol having from 2 to 11 carbon atoms. This copolyester coating can consist of the polyester condensation product of the following monomers or their polyester forming equivalents:

(a) about 60 to 75 mole % of terephthalic acid;

(b) about 15 to 25 mole % of at least one aliphatic dicarboxylic acid of the formula $HOOC(CH_2)_nCOOH$, wherein n ranges from about 1 to about 11;

(c) greater than from about 6 up to about 15 mole % of at least one sulfomonomer containing an alkali metal sulfonate group attached to a dicarboxylic aromatic nucleus; and (d) stoichiometric quantities of about 100 mole % of at least one copolymerizable aliphatic or cycloaliphatic alkylene glycol having from about 2 to about 11 carbon atoms. This polyester condensation product is described in U.S. Pat. Nos. 5,380,587 and 4,525,419. Such products are commercially available from Eastman Chemical Company under the product designation "Eastek™31125"

In a still further embodiment of the invention, the adhesive anchor layer is polyester condensation product (v) which is, typically, a polyester comprising repeating units of the following: isophthalic acid, 5-sulfoisophthalic acid, 1,4-cyclohexanedimethanol and diethylene glycol. Typically, this coating is a linear, water-dissipatable polyester having an inherent viscosity of at least about 0.1 as measured in a 60 to 40 parts by weight solution of phenol/tetrachloroethane at 25° C., and at a concentration of 0.5 grams of polyester in 100 ml of solvent, the polyester containing substantially equimolar proportions of acid moiety repeating units (100 mole %) to hydroxy moiety repeating units (100 mole %), the polyester comprising repeating units of components (a), (b), (c) and (d), as follows, wherein all stated mole percentages are based on the total of all acid and hydroxy moiety repeating units being equal to 200 mole %: (a) about 90 to about 97 mole % isophthalic acid, (b) about 3 to about 10 mole % 5-sulfoisophthalic acid or its alkali metal salt, (c) about 70 to about 85 mole % 1,4-cyclohexanedimethanol, and (d) about 15 to about 30 mole % diethylene glycol. These polyesters have been described as linear, water dissipatable polyesters having inherent viscosities as disclosed above and having the equimolar proportions of acid and hydroxy moieties referred to above. These polyesters are described in U.S. Pat. Nos. 5,006,598 and 5,382,473.

Copolymer (vi)

The (B) ink base layer can be selected from the group consisting of a copolymer (vi). Copolymer (vii) is an acrylic copolymer. The acrylic copolymer, typically, comprises a copolymer of a $C_1$ to $C_8$ acrylate, $C_1$ to $C_8$ methacrylate and an acid selected from the group consisting of acrylic acid, methacrylic acid, itaconic acid and maleic acid. Examples of the alkyl groups of the alkyl acrylate include methyl, ethyl, hexyl and isooctyl. Examples of the alkyl groups of the alkyl methacrylate include methyl, ethyl and isobutyl. The copolymer is, typically, made from a monomer feed which contains at least one of each of the foregoing monomers.

In general the copolymers are prepared from and contain from about 40 to about 75 weight percent, specifically from about 60 to about 70 weight percent of the first monomer, from about 15 to about 50 weight percent, specifically, from about 25 to about 35 weight percent of the second monomer and from about 0.1 to about 10 weight percent, specifically about 1 to about 5 weight percent, of the third monomer. All ratios are based on the total weight of the monomer feed.

These emulsion polymers have an average molecular weight of from about 20,000 to about 150,000, specifically about 50,000 to about 90,000 as determined by gel permeation chromatography (GPC) and have a calculated Tg of from about −15° C. to about +15° C., preferably from about −10° C. to about +1° C. The diameter of the terpolymer particles are generally in the range of from about 0.05 to about 0.3 microns. Useful terpolymers are prepared as described in U.S. Pat. No. 5,070,164.

Styrene Copolymer (vii)

The ink base layer can be a prime coating having on an external or outer surface thereof a styrene copolymer (vii).

The styrene copolymer (vii) is, typically, a $C_1$ to $C_8$ acrylate, $C_1$ to $C_8$ methacrylate and acrylic acid or methacrylic acid. Typically, this copolymer is a water soluble emulsion made by conventional emulsion polymerization techniques. The monomer feed comprises styrene, alkyl acrylate, such as butyl acrylate, and alkyl methacrylate, such as butyl methacrylate, and acrylic or methacrylic acid. Typically, the styrene copolymer contains from about 20 to about 60%, specifically from about 30 to about 50% styrene; about 75 to about 30%, specifically about 65 to about 45% alkyl acrylate, alkyl methacrylate and mixtures thereof; and about 3 to about 10%, specifically about 4 to about 7% acrylic or methacrylic acid. Styrene copolymers are sold by Zeneca Resins under the product designation "NeoCryl XK-64".

An important feature of the invention is that each of the (A) adhesive anchor layer and the (B) ink base layer are different. As long as these layers differ, surface-to-surface blocking is low.

"Blocking" is the tendency of the film to adhere to itself when two or more surfaces of the film are pressed together, for example, when sheets or mill rolls of the film are stacked in storage. Blocking tends to be more pronounced at elevated temperatures and high relative humidities. Under normal storage conditions the maximum temperatures encountered, usually, range from about 100° F. to about 110° F. (about 38° C. to about 43° C.) and the relative humidity can be as high as 90 to 100 percent. Films which resist blocking under these conditions are commercially important. With the present invention, the two-side coated facestock can be wound into a roll or stacked in sheets so that the adhesive anchor layer and the print base layer are in contact without posing blocking problems.

Before applying the coating compositions to the appropriate substrate, typically, the surfaces of the substrate are treated to insure that the coating will strongly adhere to the film, which eliminates or avoids peeling of the coating from the film. This treatment is, usually, accomplished by known techniques such as, for example, film chlorination, i.e. exposure of the film to gaseous chlorine, treatment with oxidizing agents such as chromic acid, hot air or steam treatment, corona or flame treatment and the like. Although any of these techniques may be effectively employed to pretreat the film surface, a very useful method of treatment is electronic treatment by exposing the film surface to a high voltage corona discharge while passing the film between a pair of spaced electrodes. After electronic treatment, the surface may be coated.

The prime coating, which is especially useful in layers (i), (vi) and (vii), can be an epoxy-based primer or a poly (ethyleneimine). Usually, the prime coating is a member selected from the group consisting of (A) the reaction product of acidified aminoethylated vinyl polymer and epoxy resin, (B) poly(ethyleneimine), and (C) mixtures thereof. The epoxy primer is especially useful with the sulfonated polyester of layers (iv) and (v).

Appropriate acidified amino ethylated vinyl polymer prime coatings are described in U.S. Pat. No. 5,066,434.

The primer materials include the reaction product of an epoxy resin and an acidified aminoethylated vinyl polymer. The contemplated epoxy resins are glycidyl ethers of polyhydroxy compounds. Typical polyhydroxy compounds which may be used include bisphenol A, ring substituted bisphenol A, resorcinol, hydroquinone, phenol-formaldehyde, novolac resins, aliphatic diols, such as ethylene glycol, propylene glycol, 1,4-butanediol, 1,6-hexanediol, glycerol, lower alkyl hydantoins and mixtures thereof.

Acceptable epoxy resins are those made by the glycidation reaction between epichlorohydrin and bisphenol A. Epoxy resins of this type are commonly classified by their epoxy equivalent weight (EEW) which is defined as the weight of resin in grams which contains one gram equivalent of epoxy groups. Resins with an EEW ranging from about 170 to about 280 may be used but the preferred range is from about 180 to about 210.

A variation in the composition of the epoxy resin component is one in which a hydantoic compound is substituted for the bisphenol A. For example, 1,1-dimethyl hydantoin may be employed in a low molecular weight epoxy resin since resins based on this material are completely water soluble thereby eliminating the necessity for emulsification.

Although the specific structure of the epoxy resin is not critical to the primer employed, important considerations in the selection of the epoxy resin depend upon its physical state. For example, it is important to be liquid and capable of being readily dispersed or dissolved with the second component or curing agent as described below. If the epoxy resin is of low viscosity, it may be stirred directly into the second component, e.g., curing agent, however, it is advantageous to employ the epoxy resin in an aqueous emulsion.

The second component in the epoxy primer is an amino modified acrylic polymer which is water soluble. This polymer is a curing agent for the epoxy compound. A particular material is described in U.S. Pat. No. 3,719,629 and may be generically described as an acidified aminoethylated interpolymer having pendant amino alkylate groups. This material is produced by polymerizing acrylate, methacrylate, styrene or other suitable monomers with sufficient methacrylic acid or acrylic acid to give a —COOH content of about 7.5 to about 12.5%. Solvent polymerization techniques are preferred. The polymer is then reacted with ethyleneimine monomer and acidified with hydrochloric acid to render the polymer water soluble.

The primer coating may be applied to the substrate as a dispersion or as a solution, from an organic vehicle, for example, an alcohol or an aromatic hydrocarbon, such as xylene or a mixture thereof.

In one embodiment of the invention, a liquid epoxy resin is emulsified in a solution of the curing agent by rapid stirring. Thereafter, the resulting dispersion is diluted with water to the desired concentration for coating, which typically includes from about 2 to about 25% solids.

When mixing the epoxy resin with the curing agent, it is generally worthwhile to use stoichiometric equivalent balance of epoxy and amine groups. However, it has been found that the stoichiometric ratio may be varied over a wide range, for instance, from about one epoxy group to about three amine groups through three epoxy groups to one amine group and, even from about one epoxy group to two amine groups through about two epoxy groups to about one amine group, without seriously affecting the usefulness as a primer.

The solution or dispersion of epoxy resin and curing agent can contain small amounts of wetting agents in order to facilitate the application of the prime material to the surface of the film. Conventional non-ionic wetting agents which can be employed include the hexyl or benzyl ether of ethylene glycol, the hexyl ether of diethylene glycol, butyl alcohol, hexyl alcohol, octyl alcohol, diacetone alcohol and the like.

Although mixtures of the epoxy resin and the curing agents will cross link or cure without the addition of catalyst, it has been found useful, in certain instances, to use an amine catalyst. Such catalysts include propylene diamine, hexamethylene diamine, etc. The alternative prime coating material (B) poly(ethyleneimine) is known as PEI. The use of PEI as a prime coating for polymeric coatings on film substrates such as cellophane and polyolefins is well known as disclosed in British Patent Nos. 766 827 and 910 875. This material is also described in U.S. Pat. No. 3,230,175. A commercially available material of this type is known as EPOMIN L50, a product of Nippon Shokubai. This material can be applied from either aqueous or organic solvent media such as ethanol in a solution comprising about 0.1 to 0.6% by weight of the poly(ethyleneimine).

The imine primer provides an overall adhesively active surface for thorough and secure bonding with the subsequently applied coating composition of this invention. The primer is usually applied to the treated base film by conventional solution coating means such as direct or reverse direct gravure roller application. An effective coating solution concentration of the poly(ethyleneimine) applied from either aqueous or organic solvent media such as ethanol, for example, is a solution comprising about 0.5 percent by weight of the poly(ethyleneimine).

When a mixture of epoxy primer and poly(ethyleneimine) is employed, any ratio is contemplated.

When either the adhesive anchor or the ink base layer comprises the interpolymer of (i) or the ink base layer comprises the copolymer of (vi) or (vii), a surface-treated prime coating is important for good adhesion to the substrate.

It is possible to apply the coating compositions to the surface of the film substrate from a non-aqueous solution of the composition using, for example, various organic solvents such as alcohols, ketones, esters, etc. However, since the coating may, as stated below, containing colloidal inorganic materials and since such materials are difficult to keep well dispersed in organic solvents, it is important that the coating be applied from aqueous media and, usually, from an alkaline aqueous solution.

The coating is applied to the surface of a, typically, corona discharge or flame treated material and, in some instances, a surface treated and primed film material in any conventional and known manner, such as by gravure coating, reverse direct gravure coating, roll coating, dipping, spraying, etc. The excess aqueous solution may be removed by squeeze rolls, doctor knives, etc. In general, the thickness and distribution of the applied coating is such to anchor the adhesive to the substrate. In most instances, the coating is applied in such amount that there will be deposited upon drying, a smooth evenly distributed layer of from about 0.9 to about 1.1 $g/m^2$ thickness or coat weight.

Typically, the coating on the film is subsequently dried by hot air, radiant heat or by any other convenient means. Ammonia evolves upon drying, leaving a non-water soluble, clear glossy coated film.

Antiblocking materials may be used in the coatings. appropriate anti-blocking materials include wax and wax-like materials, although in some instances wax may inhibit adhesive anchorage properties.

A particular type of thermoplastic film which is used in this invention is a polyolefin, typically oriented polypropylene. However, the substrate contemplated can include any thermoplastic that forms a thin film that can be employed for packaging, labeling or decoration. Within this class of materials are polyolefins, nylon, polyethyleneterephthalate and polycarbonate. The contemplated substrates also include coextrudates of the foregoing materials, laminates of any two or more of these materials or interblends of any of the materials extruded as a single base film. Polyolefin homopolymers and copolymers of propylene and ethylene are useful. Particularly preferred is polypropylene containing at least 80 wt.% of isotactic polypropylene. The base substrate layer can be a homopolymer polypropylene having a melting point ranging from about 320° F. (160° C.) to about 330° F. (166° C.). Commercially available materials include Exxon 4252 and FINA 3371. The substrate can be coextruded with at least one skin layer or it can be laminated to at least one other film. Typically when the film is coextruded the thickness of the skin layers range from about 2 to about 18% of the total film thickness. The skin layers can be a copolymer of propylene and another olefin such as ethylene and/or butene-1. Another olefin can be present in the copolymer. A preferred substrate is polypropylene with at least one skin layer selected from the group consisting of polyethylene, polypropylene, copolymer of propylene and ethylene, copolymer of ethylene and butene-1, terpolymers of any of the foregoing and maleic anhydride modified polymers.

Another useful substrate comprises polypropylene interblended with a minor proportion of a member selected from the group consisting of polyethylene, copolymers of ethylene and an alpha olefin, copolymers of propylene and an alpha olefin, terpolymers of olefins and maleic anhydride modified polymers.

White opaque, cavitated polypropylene is also a useful substrate. These films are described in U.S. Pat. Nos. 4,758,462; 4,965,123 and 5,209,884.

Metallized films are also contemplated. Usually, the corona or flame treated film surface, usually comprising or consisting of polypropylene or polyethylene (medium or high density polyethylene), is metallized by vacuum deposition of aluminum. The coating is applied to the metallized surface.

As alluded to above, multilayer films having three or more layers, e.g. five layers and sometimes even seven layers, are contemplated. In five-layer films there is usually an intermediate polypropylene layer on either side of the core layer as disclosed in U.S. Pat. Nos. 5,209,854 and 5,397,635.

The films employed can be uniaxially or biaxially oriented. The typical range of orientation is from 4 to 10 times in the machine direction and from 7 to 12 times in the transverse direction. The film thickness can range from about 10 to about 100 µm.

In order to produce a label facestock having satisfactory slip properties for machinability and ease of handling, the coatings can be formulated with a solid finely divided, water insoluble, inorganic material such as colloidal silica, to function as a slip agent. Other finely divided inorganic materials which can be used to enhance slip properties include such water insoluble solids as diatomaceous earth, calcium silicate, bentonite, talc and finely divided clay. These finely divided inorganic materials can have a particle size between 0.1 and 10 µm., an alkali stabilized silica dispersion is the preferred material. Particulates which enhance opacity are also contemplated such as titanium dioxide.

In label stock structures contemplated a pressure sensitive adhesive is located between the adhesive anchor layer of the two-side coated facestock and a release surface of a release liner. The pressure sensitive label stock is run through a die-cutter to produce labels affixed to a continuous release layer. Typical pressure sensitive adhesives are hot melt adhesives, for example, styrene-isoprene-styrene block copolymers (the "Duro-tak" line of adhesives sold by National Starch, including "Duro-tak 9866" and "Duro-tak 4206"), styrene-ethylene butylene-styrene block copolymer compounds ("Duro-tak 9684" sold by National Starch); water-based pressure sensitive adhesives, for example, acrylic emulsions (sold by Unocal under product numbers 9612, 9646 and 9202, Air Products under product designations GP-2, LC-31 and SP-27, Rohm & Haas under product designation PS-67 and National Starch under product designation Nacor-4537), ethylene vinyl acetate multipolymer emulsions (sold by National Starch under the product designation "EVA-Tak 9685" and EVA-Tak 9715), rubber-resin emulsions (sold by Dyna-tech under product designation 2412); and solvent-based pressure sensitive adhesives, for example thermoplastic acrylic (sold by National starch under product designation "Duro-tak 2434"), self-cross linking acrylic (sold by National Starch under product designation "Duro-tak 1068" and Duro-tak 1077) and rubber-based compounds (sold by National Starch under product designation "Duro-tak 6172" and "Duro-tak 9718").

Release liners contemplated are silicone release coated substrates. Substrates contemplated are supercalendered Kraft-brand paper, glassine, polypropylene, polyester (such as polyethyleneterephthalate), polyethylene coated Kraft-brand paper, polypropylene-coated Kraft-brand paper or a thermoplastic substrate sold by Mobil Chemical Company under the product name "Proliner". Typically these substrates are coated with a thermally cured silicone release coating such as vinyl functionalized polydimethylsiloxane (sold by Dow Corning under the name "Syl-off 7686"). In this system, the cross linker is, typically, dimethyl hydrogen polysiloxane (sold by Dow Corning under the name "Syl-off 7048").

Release liners comprising substrates such as glassine, poly-coated Kraft-brand paper, polyethylene terephthalate, oriented or cast polypropylene, polyethylene or polystyrene can be coated with radiation or electron-beam curable silicone such as UV-curable silicone (sold by GE under the name "UV9300", "UV 9315" using "UV 9310C" as a photoinitiator) and electron-beam curable silicone (sold by Goldschmidt under the name "RC726" and "RC705").

Typically, the pressure sensitive adhesive is coated onto the release liner and oven dried, typically at temperatures ranging from about 35° to about 120° C. However, the temperature of drying often depends upon the type of adhesive. Solvent-based adhesives are usually dried at about 66° C. and water-based adhesives are usually dried at about 93° C. After drying, the release liner is laminated to the adhesive anchor coated side of the label facestock.

EXAMPLES

Films made in accordance with the following examples are tested for blocking and adhesive anchor properties.

Blocking is measured by contacting the coated surfaces of the film in a laboratory press maintained at various temperatures, pressures and time. The force required to separate the films is determined by measuring force in g/inch (g/m) needed to pull the films apart in the Instron testing machine.

Example 1

In this example a two-side coated label facestock structure is prepared from a commercial three layer coextruded biaxially oriented base film (Mobil product 196LLB3). The film is of the structure A/B/C in which the B core layer of the film is polypropylene, the A skin layer is an ethylene-propylene copolymer and the C skin layer is an ethylene-propylene containing 0.2% siponate and 1800 ppm silica antiblock. The total film thickness is 1.96 mils (about 50 μm). Each skin layer is about 10% of the total film thickness. The A skin layer is flame treated to about 40 dynes/cm. The C skin layer is corona treated to about 40 dynes/cm.

To the A skin layer is applied, by reverse direct gravure roll coating, a coating formulated from an iminated polymer (100 phr, Zeneca XA-5090, 19% solids) and silica antiblock (0.4 phr Siloblock S42 sold by W. R. Grace). The coat weight is 1.09 g/m².

To the C layer is applied by reverse direct gravure roll coating, an epoxy primer followed by a sulfonated polyester resin coating as described in Example 2 of U.S. Pat. No. 5,382,473.

The blocking of the A layer coating to the C layer coating is determined to be less than 15 g/in (5.9 g/cm) at about 140° F. (60° C.).

Adhesive anchoring ability of the coated A skin layer coating is measured by applying Tesa 7475 tape to the coated surface and aging for 24 hours at ambient conditions. The TLMI machine peels the tape from the coated surface at an angle of 180° and 300 inches per minute (762 cm/min). The peel force measured by the TLMI is recorded and the surface is visually observed to determine whether any adhesive remains. Since a surface exhibiting good adhesive anchorage removes the adhesive from the tape, it is desirable for the adhesive to transfer from the Tesa tape to the surface. The measured peel force is 3829 g/in (1507 g/cm) and visual observation reveals that adhesive transfers from the tape to the coated surface.

Example 2

In this example, a two-side coated label facestock structure is made from a white opaque biaxially oriented film. The film is a 5-layer A/B/C/D/E structure in which the C core layer is voided polypropylene, the voiding agent is polybutylene terephthalate. The A layer is medium density polyethylene, the B layer is polypropylene compounded with 8 wt. % $TiO_2$, the D layer is polypropylene homopolymer and the E layer is polypropylene homopolymer and silica antiblock. The total film is about 3 mil (76 μm). The total B and D intermediate layers are 17% of the film thickness while the total A and E skin layers are 3% of film thickness.

To the outside surface of the A layer is applied a coating formulated from an iminated polymer (100 phr, Zeneca XA-5090, 19% solids) and silica antiblock (0.4 phr Siloblock S42 sold by W. R. Grace). The coat weight ranges from 0.6 to 0.7 g/msi (0.93 to 1.09 g/m²).

To the outside surface of the E layer is applied a coating which is a 50:50 mixture of the iminated polymer (50 phr, Zeneca XA-5090, 19% solids), Mobil commercial acrylic copolymer (50 phr, 22% solids) talc (0.5 phr, 10% solids) and silica (5 phr, 40% solids). The coat weight ranges from 0.6 to 0.7 g/msi (0.93 to 1.09 g/m²).

The blocking of the A layer coating to the E layer coating is tested under various conditions the results of which are reported below. In a control sample the blocking of the coated A side to the treated (uncoated) E side at 750 psi (5,171 kPa), 130° F. (54° C.) for 1 hour is severe so the film tears. In another control sample under the same conditions of pressure and time, but at about 70° F. (20° C.) the blocking measured is 200 to 300 g/in (79 to 118 g/cm).

| Test Conditions pressure (kPa)/temp. (°C.)/time (hrs) | Blocking Force (g/cm) |
| --- | --- |
| 5,171/38/1 | 4 |
| 5,171/49/1 | 10 |
| 5,171/54/1 | 18 |
| 861/52/72 | 8 |
| 861/29/72 | 6 |

As the above data show, under varied conditions, the films exhibited low blocking of the A layer coating to the E layer coating.

Adhesive anchorage is tested by cutting a composite label into strips of about 50 mm. The release liner is removed from the film and the exposed adhesive surface of the film is placed onto a stainless steel plate. The film is secured to the steel plate by rolling it down with a 1 kg rubber roller. The TLMI machine is used to peel the label from the steel plate at an angle of 180° and 300 inches per minute (762 cm/min). The peel force measured by the TLMI is recorded. The steel surface is visually observed to determine whether any adhesive is removed from the label surface. A film exhibiting good adhesive anchorage leaves no trace of adhesive on the stainless steel plate.

The coated film performs well in the above described adhesive anchorage test. Several commercial adhesives were used in the test. The film leaves no adhesive on the steel plate.

What is claimed is:

1. A printable facestock structure comprising a polymeric film substrate having on a first surface thereof (A) an adhesive anchor layer and on a second surface thereof (B) an ink base layer, the (A) and (B) layers are selected from the group consisting of:

(i) a prime coating having on an external surface a functional coating of an interpolymer of (a) an α,β-monoethylenically unsaturated carboxylic acid selected from the group consisting of acrylic acid, methacrylic acid and mixtures thereof; and (b) a neutral monomer ester comprising an alkyl acrylate ester and an alkyl methacrylate ester; and (ii) an iminated polymer of methyl methacrylate, $C_2$ to $C_8$ alkyl methacrylate or $C_1$ to $C_8$ alkyl acrylate and an ethylenically unsaturated carboxylic acid;

or the (A) adhesive anchor layer is selected from the group consisting of:

(iii) a mixture of the functional coating of (i) an interpolymer of (a) an $\alpha,\beta$-monoethylenically unsaturated carboxylic acid selected from the group consisting of acrylic acid, methacrylic acid and mixtures thereof; and (b) a neutral monomer ester comprising an alkyl acrylate ester and an alkyl methacrylate and (ii) an iminated polymer of methyl methacrylate, $C_2$ to $C_8$ alkyl methacrylate or $C_1$ to $C_8$ alkyl acrylate and an ethylenically unsaturated carboxylic acid;

(iv) a linear water dissipatable polyester condensation product of the following monomers or their polyester forming equivalents: terephthalic acid, an aliphatic dicarboxylic acid, a sulfomonomer containing alkali metal sulfonate group attached to a dicarboxylic aromatic nucleus; and stoichiometric quantities of about 100 mole % of at least one copolymerizable aliphatic or cycloaliphatic alkylene glycol having from 2 to 11 carbon atoms; and (v) a polyester comprising repeating units of the following components: isophthalic acid, 5-sulfoisophthalic acid, 1,4-cyclohexanedimethanol and diethylene glycol; or the (B) ink base layer is selected from the group consisting of:

(vi) a prime coating having on an external surface a functional coating of a copolymer of a $C_1$ to $C_8$ acrylate, $C_1$ to $C_8$ methacrylate and acrylic acid or methacrylic acid; and (vii) a prime coating having on an external surface a functional coating of a styrene copolymer of a $C_1$ to $C_8$ acrylate, $C_1$ to $C_8$ methacrylate and acrylic acid or methacrylic acid, provided that each of the (A) adhesive anchor layer and the (B) ink base layer is different.

2. The printable film as described in claim 1 in which the polymeric film substrate comprises propylene homopolymer.

3. The printable film structure as described in claim 1 in which the (A) adhesive anchor layer is (iv) a linear water dissipatable polyester condensation product of the following monomers or their polyester equivalents: terephthalic acid, an aliphatic dicarboxylic acid, a sulfomonomer containing an alkali metal sulfonate group attached to a dicarboxylic aromatic nucleus; and stoichiometric quantities of 100 mole % of at least one copolymerizable aliphatic or cycloaliphatic alkylene glycol having from 2 to 11 carbon atoms and the (B) ink base layer is (ii) an iminated polymer of methyl methacrylate, $C_2$ to $C_8$ alkyl methacrylate, $C_1$ to $C_8$ alkyl acrylate and an ethylenically unsaturated carboxylic acid.

4. The printable film as described in claim 3 in which the polymeric film substrate comprises a propylene homopolymer core layer and at least one additional polymeric layer on a side of the core layer, the additional polymeric layer is selected from the group consisting of propylene homopolymer, ethylene homopolymer, ethylene-propylene copolymer and propylene-ethylene-butene-1 terpolymer.

5. The printable film as described in claim 4 in which the propylene homopolymer core layer comprises a polypropylene matrix core layer within which is located a strata of voids, the population of voids being such as to cause a significant degree of opacity.

6. The printable film structure as described in claim 1 in which the (A) adhesive anchor layer is (iii) a mixture of (i) the (a) $\alpha,\beta$-monoethylenically unsaturated carboxylic acid selected from the group consisting of acrylic acid, methacrylic acid and mixtures thereof; and (b) a neutral monomer ester comprising an alkyl acrylate ester and an alkyl methacrylate ester and (ii) the iminated polymer of methyl methacrylate, $C_2$ to $C_8$ alkyl methacrylate or $C_1$ to $C_8$ alkyl acrylate and an ethylenically unsaturated carboxylic acid and the (B) ink base layer is (ii) an iminated polymer of methyl methacrylate, $C_2$ to $C_8$ alkyl methacrylate, $C_1$ to $C_8$ alkyl acrylate and an ethylenically unsaturated carboxylic acid.

7. The printable film as described in claim 6 in which the polymeric film substrate comprises a propylene homopolymer core layer and at least one additional polymeric layer applied to a surface of the core layer, the additional polymeric layer is selected from the group consisting of propylene homopolymer, ethylene homopolymer, ethylene-propylene copolymer and propylene-ethylene-butene-1 terpolymer.

8. The printable film as described in claim 7 in which the propylene homopolymer core layer comprises a polypropylene matrix core layer within which is located a strata of voids, the population of voids being such as to cause a significant degree of opacity.

9. The printable film as described in claim 8 in which the polymeric substrate comprises five layers in which there is a first outer skin layer comprising medium density polyethylene, a second outer skin layer comprising polypropylene, a first intermediate polymeric layer located between the first outer skin layer and the core layer and a second intermediate polymeric layer located between the second outer skin layer and the core layer.

10. The printable film as described in claim 9 in which the first intermediate layer comprises polypropylene and an opacifying agent and the second intermediate layer comprises polypropylene and is substantially free of opacifying agent.

11. The printable film as described in claim 2 in which the (A) adhesive anchor layer and/or the (B) ink base layer further comprises colloidal silica particles.

12. The printable film as described in claim 6 in which the (A) adhesive anchor layer further comprises colloidal silica and talc.

13. The printable film as described in claim 1 in which the prime coating of the (B) layer (vi) and (vii) comprises an epoxy or poly(ethyleneimine) prime coating.

14. The printable film as described in claim 1 in which at least one surface of the polymeric substrate is metallized.

15. The printable film as described in claim 1 in which further comprises a film form liner, an adhesive coating adhered to an outer surface of the liner, the outer surface being located adjacent to the adhesive anchor layer.

16. A composite label structure comprising a film form liner, an adhesive coating adhered to an outer surface of the liner, the outer surface being located adjacent to a face film stock comprising a thermoplastic substrate, the face film stock being secured to the surface of the adhesive coating, the face film stock comprising an adhesive anchor layer located between the adhesive coating and the thermoplastic substrate, the adhesive anchor layer selected from the group consisting of (i) a prime coating having on an external surface an adhesive anchor coating of an interpolymer of (a) an α,β-monoethylenically unsaturated carboxylic acid selected from the group consisting of acrylic acid, methacrylic acid and mixtures thereof; an (b) a neutral monomer ester comprising an alkyl acrylate ester and an alkyl methacrylate ester;

(ii) an iminated polymer of methyl methacrylate, $C_2$ to $C_8$ alkyl methacrylate or $C_1$ to $C_8$ alkyl acrylate and an ethylenically unsaturated carboxylic acid;

(iii) a mixture of (i) an interpolymer of (a) an α,β-monoethylenically unsaturated carboxylic acid selected from the group consisting of acrylic acid, methacrylic acid and mixtures thereof; and (b) a neutral monomer ester comprising an alkyl acrylate ester and an alkyl methacrylate and (ii) an iminated polymer of methyl methacrylate, $C_2$ to $C_8$ alkyl methacrylate or $C_1$ to $C_8$ alkyl acrylate and an ethylenically unsaturated carboxylic acid;

(iv) a linear water dissipatable polyester condensation product of the following monomers or their polyester forming equivalents: terephthalic acid, an aliphatic dicarboxylic acid, a sulfomonomer containing an alkali metal sulfonate group attached to a dicarboxylic aromatic nucleus; and stoichiometric quantities of about 100 mole % of at least one copolymerizable aliphatic or cycloaliphatic alkylene glycol having from 2 to 11 carbon atoms; and (v) a polyester comprising repeating units of the following components: isophthalic acid, 5-sulfoisophthalic acid, 1,4-cyclohexanedimethanol and diethylene glycol.

17. The composite label structure described in claim 16 in which the polymeric film substrate comprises propylene homopolymer.

18. The composite label structure described in claim 16 in which the adhesive anchor layer is (iv) a linear water dissipatable polyester condensation product of the following monomers or their polyester equivalents: terephthalic acid, an aliphatic dicarboxylic acid, a sulfomonomer containing an alkali metal sulfonate group attached to a dicarboxylic aromatic nucleus; and stoichiometric quantities of 100 mole % of at least one copolymerizable aliphatic or cycloaliphatic alkylene glycol having from 2 to 11 carbon atoms.

19. The composite label structure described in claim 18 in which the polymeric film substrate comprises a propylene homopolymer core layer and at least one additional polymeric layer applied to a surface of the core layer, the additional polymeric layer is selected from the group consisting of propylene homopolymer, ethylene homopolymer, ethylene-propylene copolymer and propylene-ethylene-butene-1 terpolymer.

20. The composite label structure described in claim 19 in which the propylene homopolymer core layer comprises a polypropylene matrix core layer within which is located a strata of voids, the population of voids being such as to cause a significant degree of opacity.

21. The composite label structure described in claim 16 in which the adhesive anchor layer is (iii) a mixture of (i) the (a) α,β-monoethylenically unsaturated carboxylic acid selected from the group consisting of acrylic acid, methacrylic acid and mixtures thereof; and (b) a neutral monomer ester comprising an alkyl acrylate ester and an alkyl methacrylate ester and (ii) the iminated polymer of methyl methacrylate, $C_2$ to $C_8$ alkyl methacrylate or $C_1$ to $C_8$ alkyl acrylate and an ethylenically unsaturated carboxylic acid.

22. The composite label structure described in claim 16 in which the polymeric film substrate comprises a propylene homopolymer core layer and at least one additional polymeric layer applied to a surface of the core layer, the additional polymeric layer is selected from the group consisting of propylene homopolymer, ethylene homopolymer, ethylene-propylene copolymer and propylene-ethylene-butene-1 terpolymer.

23. The composite label structure described in claim 21 in which the propylene homopolymer core layer comprises a polypropylene matrix core layer within which is located a strata of voids, the population of voids being such as to cause a significant degree of opacity.

24. The composite label structure described in claim 22 in which the polymeric substrate comprises five layers in which there is a first outer skin layer comprising medium density polyethylene, a second outer skin layer comprising polypropylene, a first intermediate polymeric layer located between the first outer skin layer and the core layer and a second intermediate polymeric layer located between the second outer skin layer and the core layer.

* * * * *